Sept. 30, 1958   F. DE JAGER   2,854,633
CIRCUIT ARRANGEMENT FOR MEASURING A PHYSICAL QUANTITY
Filed April 30, 1956   2 Sheets-Sheet 1

INVENTOR
FRANK DE JAGER

BY *Fred M. Wagel*
AGENT

Sept. 30, 1958 F. DE JAGER 2,854,633
CIRCUIT ARRANGEMENT FOR MEASURING A PHYSICAL QUANTITY
Filed April 30, 1956 2 Sheets-Sheet 2
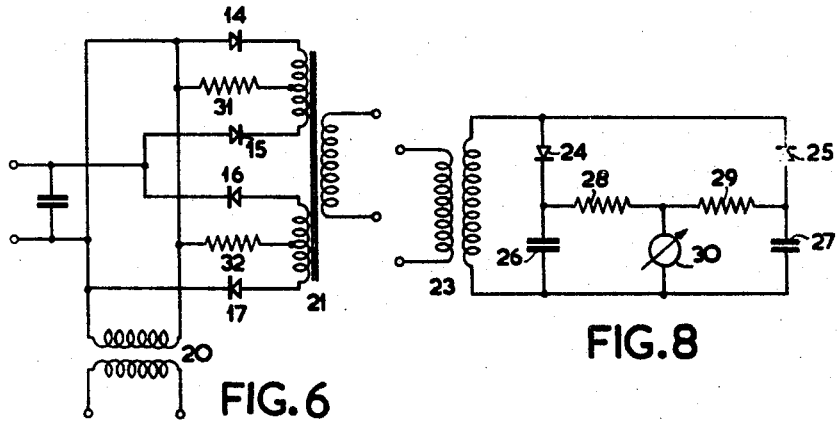
FIG.6  FIG.8
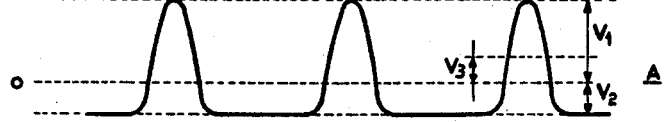
A
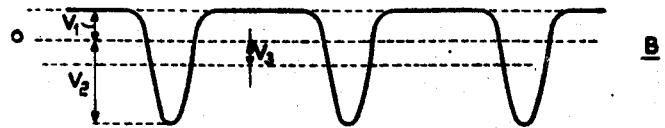
B
FIG.7
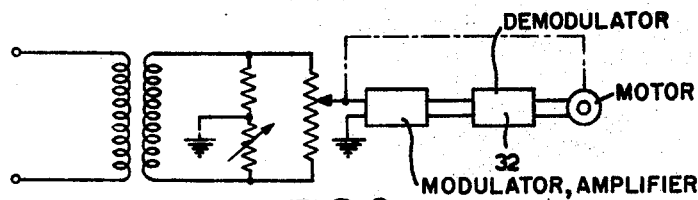
FIG.9
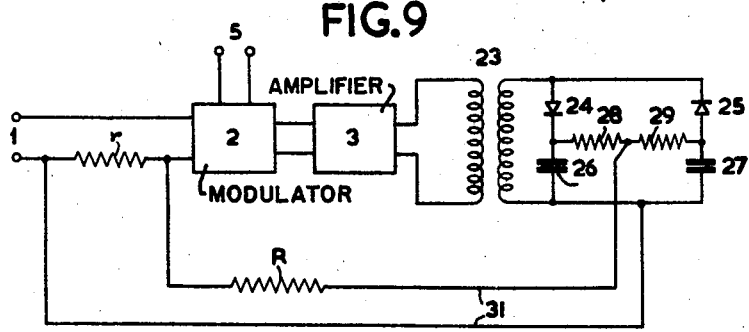
FIG.10
INVENTOR
FRANK DE JAGER
BY
AGENT United States Patent Office 2,854,633
Patented Sept. 30, 1958

2,854,633

CIRCUIT ARRANGEMENT FOR MEASURING A PHYSICAL QUANTITY

Frank de Jager, Eindhoven, Netherlands, assignor, by mesne assignments, to North American Philips Company, Inc., New York, N. Y., a corporation of Delaware Application April 30, 1956, Serial No. 581,468

Claims priority, application Netherlands May 4, 1955

5 Claims. (Cl. 324—118)

The present invention relates to a circuit arrangement for measuring a physical quantity.

Measuring devices are known, in which an alternating voltage (auxiliary alternating voltage) is modulated in accordance with a factor to be measured, for example a direct voltage or an alternating voltage of lower frequency, and the modulated alternating voltage is amplified in an amplifier, the amplified alternating voltage subsequently being demodulated in order to obtain a voltage which is substantially proportional to said factor. The last-mentioned voltage is measured by means of a direct current instrument.

In order that the invention may be readily carried into effect, it will now be described with reference to the accompanying drawings, in which:

Fig. 6 is a schematic diagram of a preferred embodiment of a modulator circuit which may be utilized in the circuit arrangement of the present invention;

Fig. 7 is a graphical presentation of voltages appearing in the demodulator circuit of Fig. 8;

Fig. 8 is a schematic diagram of an embodiment of a demodulator circuit which may be utilized in the circuit arrangement of the present invention;

Fig. 9 is a schematic diagram of an embodiment of the circuit arrangement of the present invention; and Fig. 10 is a schematic diagram of another embodiment of the circuit arrangement of the present invention.

Figure 1:
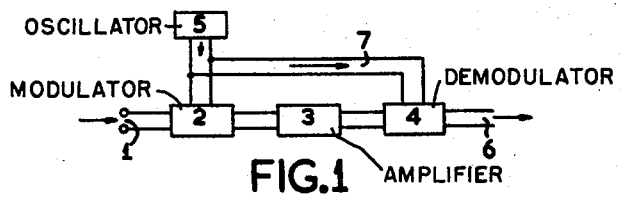
Fig. 1 is a schematic block diagram of a known circuit arrangement for measuring a physical quantity.

Fig. 1 shows diagrammatically a device intended for measuring low direct voltages. The direct voltage to be amplified occurs over leads 1. In a modulator 2, this voltage is modulated with an auxiliary alternating voltage produced in an oscillator 5. The modulated alternating voltage is amplified in an alternating voltage amplifier 3 which may comprise one or more circuits tuned to the frequency of the alternating voltage. The amplified voltage is demodulated in a device 4 in order to obtain an amplified direct voltage at the output terminals 6, which voltage varies similarly to the voltage set up at the terminals 1 and is measured by means of a direct current instrument.

A difficulty from which such known devices suffer is that special means are required to provide an output voltage with the same polarity as the voltage to be measured. The device is, in general, constructed in such manner that if the polarity of the voltage reverses at 1, the phase of the output voltage of the modulator 2 also reverses. Without special means, however, the polarity of the output voltage will remain unchanged. In order to meet said difficulty the conventional devices require demodulation, which is dependent upon the phase of the input voltage, in the demodulator 4. For this purpose, a comparison voltage is taken from the source of auxiliary alternating voltage and supplied to the demodulator 4, through leads 7. As is known, the demodulator may comprise two controlled discharge systems, to the grids of which one of the voltages is applied in anti-phase and to the anodes of which the other voltage is applied in co-phase. The direct voltage meter may be connected between the anodes.

Figure 2:
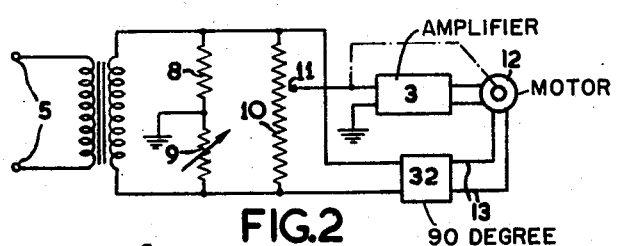
Fig. 2 is a schematic diagram of a known self-compensating circuit arrangement for measuring a physical quantity.

Fig. 2 shows diagrammatically a self-compensating measuring circuit involving a similar problem. The proposed device is supplied from an A. C. source, for example the power supply source, which is connected to terminals 5 and comprises a bridge-arrangement including resistors 8, 9 and 10, the last-mentioned of which is a potentiometer. Let it be assumed that the resistor 9 varies in accordance with a factor to be measured. If this is a temperature, the resistor 9 may, for example, be an element having a high temperature coefficient, which assumes the temperature to be measured. If mechanical stresses are to be measured, the resistor 9 may be a so-called elongation strip (tensometer). Letting the bridge be in equilibrium at a given value of the factor to be measured, it will become unbalanced upon variation of the resistance 9 due to variation of the factor to be measured. In this case, a voltage, which is amplified in the amplifier 3, is set up at the sliding contact 11 of the potentiometer 10. The amplified voltage is set up at the terminals of a motor 12 which then becomes operative and drives a sliding contact 11 so as to restore the balance of the bridge. The position of the sliding contact 11 determines the value of the factor.

Naturally, the motor 12 should be phase-susceptible so that it operates in one sense or in the other according to whether the voltage at the sliding contact 11 has a given phase or a phase which is 180° different from the given phase. A two-phase induction motor may consequently be employed, one winding of which is supplied by the output voltage of the amplifier 3, while the other is supplied through leads 13 with a phase-displacement of 90° produced in a device 32. On passing the point of equilibrium of the measuring device the voltage supplied by the amplifier undergoes a phase-displacement of 180° with the result that the motor reverses its sense of rotation.

The devices referred to have the advantage that direct voltage amplifiers, which are known to be often unstable, need not be used. However, the demodulator is comparatively intricate and requires, not only a connection to the output of the amplifier, but also a connection to the source of reference voltage through leads which may have a considerable length in measuring at a distance.

The present invention relates to a device of this type, in which an alternating voltage is modulated in accordance with a varying factor, the modulated voltage being amplified in an alternating voltage amplifier and the amplified alternating voltage being demodulated. In accordance with the invention, the auxiliary alternating voltage has a marked dissymmetrical waveform and the alternating voltage amplifier amplifies not only the fundamental wave, but also a part of the harmonics without phase variation. The demodulator comprises at least two rectifiers which are connected in such manner that the polarity of the demodulated voltage set up in the output circuit corresponds to that of the factor to be measured. The voltage amplitude of each positive half wave of the output voltage of the modulator will then differ greatly from the voltage amplitude of each negative half wave, at least if the varying factor to be measured has a value different from zero. In certain cases, this is ensured by also giving the auxiliary alternating voltage a wave form such that the amplitude of each positive half wave greatly differs from that of each negative half wave. In other cases this is insufficient and the auxiliary alternating voltage will have to consist of a succession of peaks, the duration of which is, moreover, small relatively to the time elapsing between two peaks. As appears from the following, the optimum form of the auxiliary alternating voltage is related with the manner of modulation. It is possible to produce the auxiliary alternating voltage mechanically by means of a contact which vibrates between two fixed contacts and the closure time of which at one side is longer than at the other side. In a device as shown in Fig. 1, such a contact may be directly included in the circuit of the voltage to be measured.

Figure 3:
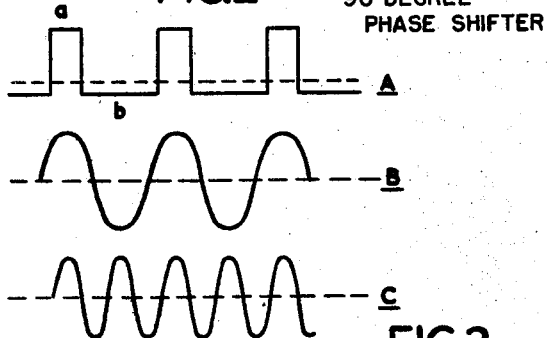
Fig. 3 is a graphical presentation of voltages appearing in the arrangement of Fig. 1.

A suitable waveform for the auxiliary alternating voltage is shown in Fig. 3, part A. The auxiliary alternating voltage is made up of a succession of peaks $a$ and interstices $b$ during which the voltage in absolute value is much lower. Fig. 3, part B shows the fundamental wave (first harmonic), and Fig. 3, part C the second harmonic in this case. In the devices shown in Figs. 1 and 2 the amplifier 3 should be such that, besides the fundamental wave at least one higher harmonic of the voltage to be amplified is transmitted.

In the device in accordance with the invention, only one pair of leads is required between the demodulator and the remaining part of the device, and the demodulator 4 may be comparatively simple.

When using the invention in a device as shown in Fig. 2 the motor may be a D. C. motor, the sense of operation of which depends upon the polarity of the voltage supplied.

Figure 4:
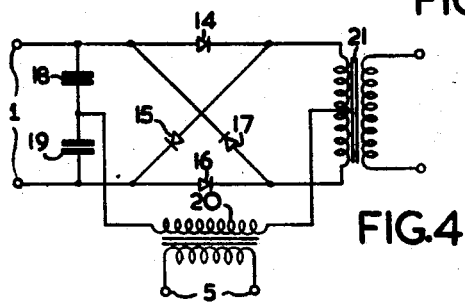
Fig. 4 is a schematic diagram of an embodiment of a modulator circuit which may be utilized in the circuit arrangement of the present invention.
Figure 5:
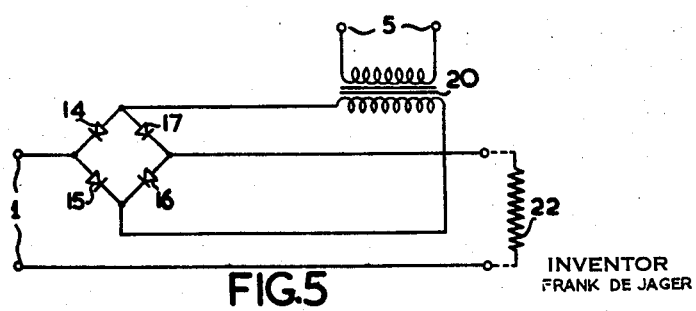
Fig. 5 is a schematic diagram of another embodiment of a modulator circuit which may be utilized in the circuit arrangement of the present invention.

Figs. 4, 5 and 6 show forms of modulators that may be used in the device in accordance with the invention. The arrangement shown in Fig. 4, which is known as a ring modulator, comprises four rectifying elements 14, 15, 16 and 17. The input direct voltage occurs at the terminals 1, the auxiliary alternating voltage being supplied via a transformer 20. The secondary winding of the transformer is connected between the common point of two capacitors 18, 19 connected in series-combination across the input terminals, and the midpoint of the primary winding of an output transformer 21. A voltage illustrated in Fig. 3, part A is set up at the terminals 5. If the input voltage has a given polarity, the output voltage of the modulator, after amplification by a normal alternating voltage amplifier, may have a curve approximately as shown in Fig. 7, part A. If the input voltage reverses in polarity the waveform shown in Fig. 7, part B ensues. The output voltage is only slightly affected by the amplitude of the auxiliary voltage.

Similar output voltages are obtained by means of the circuit-arrangement shown in Fig. 5, in which the four rectifiers are united into a bridge. The voltage of the secondary winding of the transformer 20 connected to the oscillator is set up at one of the diagonals of the rectifier bridge. The other diagonal extends between one terminal of the output impedance 22 and one input terminal. These arrangements are analogous to a mechanical switch by means of which the input voltage is periodically disconnected from the output terminals in such manner that the closure time of the switch is short or long relatively to its opening time.

A preferred modulator is shown in Fig. 6. The arrangements shown in Figs. 4, 5 and 6 preferably comprise dry rectifiers as dissymmetrically conducting elements. In the arrangement shown in Fig. 6, resistors 31 and 32 provide for operation on an advantageous part of the cell characteristic. In this case, in fact, the active voltage on the blocked cells may be made higher in absolute sense than that set up at the conducting cells, due to the voltage loss across the resistor included in the current-carrying branch of the modulator.

Fig. 8 shows an example of a demodulator for use in the device in accordance with the invention. The voltage supplied by the amplifier is supplied to the primary winding of a transformer 23, to the secondary winding of which a first series-combination of a rectifier 24 and a capacitor 26, and a second series-combination of a rectifier 25 and a capacitor 27 are connected. The rectifiers are connected in opposite senses so that the capacitors are charged with opposite polarities on the occurrence of a voltage across the secondary transformer winding. Connected between the common points of the rectifiers and the capacitors are two equal resistors 28 and 29. Between the common point of the resistors 28 and 29 and the common point of the capacitors 26 and 27 is connected a measuring instrument 30 which, in the arrangement shown in Fig. 2, may be replaced by a motor or a polarized relay operating a motor circuit. In the circuit arrangement shown in Fig. 8, if the voltage illustrated in Fig. 7, part A acts at the transformer 23, one capacitor will be charged to the amplitude $V_1$ of the positive part of the alternating voltage, while the other capacitor becomes charged to the amplitude $V_2$ of the negative part. In this case, for example, a voltage $V_3$ corresponding to $\frac{1}{2}$ $(V_1-V_2)$ is set up at the upper terminal of the measuring instrument. Since $V_1$ is postulated to exceed $V_2$ this value is positive. With the other polarity of the factor to be measured, or input voltage, the input voltage of the demodulator may be represented by the curve shown in Fig. 7, part B. In this case, the voltage $V_2$ exceeds the voltage $V_1$ so that the voltage set up at the upper terminal of the measuring instrument and corresponding to $V_3$ is negative.

Fig. 9 shows diagrammatically the use of the invention in a self-compensating measuring bridge. This circuit-arrangement is different from that shown in Fig. 2 in that the leads 13 have been omitted and a demodulator 32 is provided which operates in the manner of the demodulator shown in Fig. 8. A dissymmetrical voltage, for example shown in Fig. 3, part A, is supplied to the input terminals.

The output voltage of the demodulator of a device in accordance with the invention is eminently suitable for producing inverse feedback to the modulator input. An arrangement of this type is shown in Fig. 10, in which corresponding elements have the same reference numerals as in Figs. 1 and 8. The output voltage is supplied through leads 31, one of which comprises a resistor R, to the terminals of a series-resistor $r$ in the input of the modulator 2.

This arrangement is particularly useful if the waveform of the auxiliary alternating voltage alters slightly, with consequent variation of the impulse width and of the direct voltage produced.

While the invention has been described by means of specific examples and in specific embodiments, I do not wish to be limited thereto, for obvious modifications will occur to those skilled in the art without departing from the spirit and scope of the invention.

What is claimed is:

1. A circuit arrangement for measuring a physical quantity, comprising modulating means having inputs and an output, means for applying an auxiliary alternating voltage to an input of said modulating means, said auxiliary voltage having a substantially dissymmetrical waveform and including a succession of periods of relatively high magnitude voltage of relatively short duration and periods of relatively low magnitude voltage of relatively long duration, means for applying a first voltage dependent upon the magnitude of said physical quantity to an input of said modulating means thereby to modulate said auxiliary alternating voltage in accordance with said first voltage, alternating voltage amplifying means having an input and an output, means for applying the output voltage of said modulator to the input of said amplifying means, demodulating means comprising a pair of oppositely connected rectifiers and a pair of condensers, means connecting one of said rectifiers and one of said condensers in a first series circuit arrangement, means connecting the other of said rectifiers and the other of said condensers in a second series circuit arrangement and means for applying the output voltage of said amplifying means across said first and second series circuit arrangements whereby one of said condensers is charged through one of said rectifiers to a voltage which is substantially proportional to the said relatively high magnitude voltage and the other of said condensers is charged through the other of said rectifiers to a voltage which is substantially proportional to the said relatively low magnitude voltage thereby to produce a difference voltage which is substantially proportional to said first voltage and which corresponds in polarity to the sign of said first voltage, and means for deriving said difference voltage.

2. A circuit arrangement for measuring a physical quantity, comprising modulating means having inputs and an output, means for applying an auxiliary alternating voltage to an input of said modulating means, said auxiliary voltage having a substantially dissymmetrical waveform and including a succession of periods of relatively high magnitude voltage of relatively short duration and periods of relatively low magnitude voltage of relatively long duration, means for applying a first voltage dependent upon the magnitude of said physical quantity to an input of said modulating means thereby to modulate said auxiliary alternating voltage in accordance with said first voltage, alternating voltage amplifying means having an input and an output, means for applying the output voltage of said modulator to the input of said amplifying means, demodulating means comprising a pair of oppositely connected rectifiers and a pair of condensers, means connecting one of said rectifiers and one of said condensers in a first series circuit arrangement, means connecting the other of said rectifiers and the other of said condensers in a second series circuit arrangement and means for applying the output voltage of said amplifying means across said first and second series circuit arrangements whereby one of said condensers is charged through one of said rectifiers to a voltage which is substantially proportional to the said relatively high magnitude voltage and the other of said condensers is charged through the other of said rectifiers to a voltage which is substantially proportional to the said relatively low magnitude voltage thereby to produce a difference voltage which is substantially proportional to said first voltage and which corresponds in polarity to the sign of said first voltage, said difference voltage being proportional to the amplitude difference of the positive and negative half waves of said output voltage of said amplifying means, and means for deriving said difference voltage.

3. A circuit arrangement for measuring a physical quantity, comprising modulating means having dry type rectifiers, means for applying an auxiliary alternating voltage to said modulating means in a manner whereby said rectifiers are alternately conductive and non-conductive for substantially varying periods, said auxiliary voltage having a substantially dissymmetrical waveform and including a succession of periods of relatively high magnitude voltage of relatively short duration and periods of relatively low magnitude voltage of relatively long duration, means for applying a first voltage dependent upon the magnitude of said physical quantity to said modulating means thereby to modulate said auxiliary alternating voltage in accordance with said first voltage, alternating voltage amplifying means having an input and an output, means for applying the modulated auxiliary alternating voltage to the input of said amplifying means, demodulating means comprising a pair of oppositely connected rectifiers and a pair of condensers, means connecting one of said rectifiers and one of said condensers in a first series circuit arrangement, means connecting the other of said rectifiers and the other of said condensers in a second series circuit arrangement and means for applying the output voltage of said amplifying means across said first and second series circuit arrangements whereby one of said condensers is charged through one of said rectifiers to a voltage which is substantially proportional to the said relatively high magnitude voltage and the other of said condensers is charged through the other of said rectifiers to a voltage which is substantially proportional to the said relatively low magnitude voltage thereby to produce a difference voltage which is substantially proportional to said first voltage and which corresponds in polarity to the sign of said first voltage, and means for deriving said difference voltage.

4. A circuit arrangement for measuring a physical quantity, comprising means for deriving a first voltage dependent upon the magnitude of said physical quantity, means for producing a second voltage, means for varying the amplitude of said second voltage comprising a first potentiometer having a control member, means for combining said second voltage with said first voltage thereby to produce a residual voltage, an electrically energized adjusting member coupled to said control member, modulating means having inputs and an output, means for applying an auxiliary alternating voltage to an input of said modulating means, said auxiliary alternating voltage having a substantially dissymmetrical waveform and including a succession of periods of relatively high magnitude voltage of relatively short duration and periods of relatively low magnitude voltage of relatively long duration, means for applying said residual voltage to an input of said modulating means thereby to modulate said auxiliary alternating voltage in accordance with said residual voltage, alternating voltage amplifying means having an input and an output, means for applying the output voltage of said modulator to the input of said amplifying means, demodulating means comprising a pair of oppositely connected rectifiers and a pair of condensers, means connecting one of said rectifiers and one of said condensers in a first series circuit arrangement, means connecting the other of said rectifiers and the other of said condensers in a second series circuit arrangement and means for applying the output voltage of said amplifying means across said first and second series circuit arrangements whereby one of said condensers is charged through one of said rectifiers to a voltage which is substantially proportional to the said relatively high magnitude voltage and the other of said condensers is charged through the other of said rectifiers to a voltage which is substantially proportional to the said relatively low magnitude voltage thereby to produce a difference voltage which is substantially proportional to said residual voltage and which corresponds in polarity to the sign of said first voltage, and means for applying said difference voltage to said adjusting member to displace said control member to a position at which said residual voltage is substantially zero, the extent of the adjustment of said control member constituting the measurement of said physical quantity.

5. A circuit arrangement for measuring a physical quantity, comprising modulating means having inputs and an output, means for applying an auxiliary alternating voltage to an input of said modulating means, said auxiliary voltage having a substantially dissymmetrical waveform and including a succession of periods of relatively high magnitude voltage of relatively short duration and periods of relatively low magnitude voltage of relatively long duration, means for applying a first voltage dependent upon the magnitude of said physical quantity to an input of said modulating means thereby to modulate said auxiliary alternating voltage in accordance with said first voltage, alternating voltage amplifying means having an input and an output, means for applying the output voltage of said modulator to the input of said amplifying means, demodulating means comprising a pair of oppositely connected rectifiers and a pair of condensers, means connecting one of said rectifiers and one of said condensers in a first series circuit arrangement, means connecting the other of said rectifiers and the other of said condensers in a second series circuit arrangement and means for applying the output voltage of said amplifying means across said first and second series circuit arrangements whereby one of said condensers is charged through one of said rectifiers to a voltage which is substantially proportional to the said relatively high magnitude voltage and the other of said condensers is charged through the other of said rectifiers to a voltage which is substantially proportional to the said relatively low magnitude voltage thereby to produce a difference voltage which is substantially proportional to said first voltage and which corresponds in polarity to the sign of said first voltage, means for deriving said difference voltage from said demodulating means, and means for applying said difference voltage to an input of said modulating means in inverse feedback connection.

References Cited in the file of this patent

UNITED STATES PATENTS

| | | |
|---|---|---|
| 2,459,104 | Gilbert | Jan. 11, 1949 |
| 2,603,779 | Ferrill | July 15, 1952 |
| 2,732,527 | Emanuelsson | Jan. 24, 1956 |